United States Patent
Boydens et al.

(10) Patent No.: US 9,973,710 B2
(45) Date of Patent: May 15, 2018

(54) SENSOR ARRANGEMENT FOR MONITORING AN UNLOADING PROCESS OF AN AGRICULTURAL HARVESTER

(71) Applicant: CNH Industrial America LLC, New Holland, PA (US)

(72) Inventors: Joachim Boydens, Zedelgem (BE); Bart M. A. Missotten, Herent (BE); Pieter Vanysacker, Moere (BE); Karel M. C. Viaene, Moorslede (BE)

(73) Assignee: CNH Industrial America LLC, New Holland, PA (US)

( * ) Notice: Subject to any disclaimer, the term of this patent is extended or adjusted under 35 U.S.C. 154(b) by 121 days.

(21) Appl. No.: 15/103,217

(22) PCT Filed: Dec. 10, 2014

(86) PCT No.: PCT/EP2014/077263
§ 371 (c)(1),
(2) Date: Jun. 9, 2016

(87) PCT Pub. No.: WO2015/086697
PCT Pub. Date: Jun. 18, 2015

(65) Prior Publication Data
US 2016/0323519 A1  Nov. 3, 2016

(30) Foreign Application Priority Data
Dec. 10, 2013 (BE) .................. 2013/0829

(51) Int. Cl.
*H04N 5/247* (2006.01)
*A01D 41/12* (2006.01)
(Continued)

(52) U.S. Cl.
CPC ......... *H04N 5/247* (2013.01); *A01D 41/1217* (2013.01); *A01D 43/073* (2013.01);
(Continued)

(58) Field of Classification Search
None
See application file for complete search history.

(56) References Cited

U.S. PATENT DOCUMENTS 5,575,316 A * 11/1996 Pollklas ............... A01D 43/073
141/198
6,097,425 A  8/2000 Behnke et al.
(Continued)

FOREIGN PATENT DOCUMENTS

DE  19749231 A1  5/1999
DE  102010043854 A1  5/2012
(Continued)

OTHER PUBLICATIONS

PCT/EP2014/077263, International Search Report, dated Mar. 2, 2015, 4 pages.
PCT/EP2014/077263, Written Opinion, dated Mar. 2, 2015, 5 pages.

*Primary Examiner* — Utpal Shah
(74) *Attorney, Agent, or Firm* — Peter K. Zacharias; Patrick M. Sheldrake

(57) ABSTRACT

A sensor arrangement for a forage harvester. The sensor arrangement includes a frame, a CCD or CMOS camera mounted to the frame in a first position, and a time-of-flight camera mounted to the frame in a second position. The CCD or CMOS camera is mounted to the frame in the first position such that, when a filling wagon is located with respect to the forage harvester in a filling position, a first image of at least a portion of the filling wagon is capturable by the first camera. The time-of-flight camera is mounted to the frame in the second position such that, when the filling wagon is located with respect to the forage harvester in the filling position, a second image of a segment of the portion is capturable by the second camera.

14 Claims, 1 Drawing Sheet

(51) Int. Cl.
*G06T 7/70* (2017.01)
*A01D 43/073* (2006.01)
*A01D 43/08* (2006.01)
*A01D 90/10* (2006.01)
*A01D 101/00* (2006.01)

(52) U.S. Cl.
CPC .......... *A01D 43/087* (2013.01); *A01D 90/10* (2013.01); *G06T 7/70* (2017.01); *A01D 2101/00* (2013.01)

(56) References Cited

U.S. PATENT DOCUMENTS

| | | | |
|---|---|---|---|
| 6,682,416 B2* | 1/2004 | Behnke | A01B 69/008 141/231 |
| 6,943,824 B2 | 9/2005 | Alexia et al. | |
| 8,234,047 B2 | 7/2012 | Madsen et al. | |
| 8,451,139 B2 | 5/2013 | Morselli et al. | |
| 8,499,537 B2 | 8/2013 | Correns et al. | |
| 8,656,693 B2 | 2/2014 | Madsen et al. | |
| 8,682,540 B2 | 3/2014 | Missotten et al. | |
| 9,002,591 B2* | 4/2015 | Wang | A01D 41/1278 701/50 |
| 9,119,342 B2* | 9/2015 | Bonefas | A01D 34/001 |
| 9,313,951 B2* | 4/2016 | Herman | A01D 43/087 |
| 9,326,443 B2* | 5/2016 | Zametzer | A01D 41/127 |
| 9,699,968 B2* | 7/2017 | Posselius | A01F 15/08 |
| 2003/0010004 A1* | 1/2003 | Krone | A01D 43/073 56/10.2 G |
| 2003/0174207 A1* | 9/2003 | Alexia | A01D 43/073 348/89 |
| 2006/0213167 A1* | 9/2006 | Koselka | A01D 46/30 56/10.2 A |
| 2009/0044505 A1 | 2/2009 | Huster et al. | |
| 2010/0332051 A1 | 12/2010 | Kormann | |
| 2011/0061762 A1* | 3/2011 | Madsen | A01D 43/087 141/1 |
| 2012/0263560 A1 | 10/2012 | Diekhans et al. | |
| 2012/0316737 A1* | 12/2012 | Missotten | A01D 41/1217 701/50 |
| 2013/0211675 A1* | 8/2013 | Bonefas | B62D 12/02 701/41 |
| 2017/0105346 A1* | 4/2017 | Davidson | A01D 46/30 |

FOREIGN PATENT DOCUMENTS

| | | |
|---|---|---|
| DE | 202012103730 U1 | 10/2012 |
| DE | 102011052945 A1 | 2/2013 |
| EP | 2564683 A1 | 3/2013 |

* cited by examiner

SENSOR ARRANGEMENT FOR MONITORING AN UNLOADING PROCESS OF AN AGRICULTURAL HARVESTER

CROSS REFERENCE TO RELATED APPLICATION

This application is the National Stage of International Application No. PCT/EP2014/077263 filed Dec. 10, 2014, which claims priority to Belgian Application No. 2013/0829 filed Dec. 10, 2013, the contents of which are incorporated herein by reference.

FIELD OF THE INVENTION

The present invention relates to a sensor arrangement for an agricultural harvester. Particularly, the invention relates to a sensor arrangement for monitoring an unloading process of harvested material from an agricultural harvester into a filling wagon, such that a filling spout of the harvester can be correctly positioned to fill the filling wagon.

BACKGROUND OF THE INVENTION

An agricultural harvester, for example a forage harvester or a combine, is a farm implement that harvests plants, e.g., forage plants to make silage. Silage is grass, corn or other plant that has been chopped into small pieces. Silage can be compacted together in a storage silo, silage bunker or in silage bags. To this end, the harvester is provided to harvest the crop material from a field, to chop the crop material into short pieces, and to expel the chopped pieces (silage) from the harvester into a filling wagon. Modern harvesters are typically self-propelled. The self-propelled harvester is provided with a number of knives fixed on a drum to chop and blow the silage out a chute of the harvester (also referred to as filling spout) into a filling wagon. The filling wagon is typically another vehicle driven alongside the harvester.

In a conventional situation the harvester is operated by a first operator, and the filling wagon is operated by a second operator. Herein, the second operator drives the filling wagon along a path such that the relative position of the filling wagon with respect to the harvester is predetermined (or at least within predetermined boundaries). The first operator (of the forage harvester) operates the filling spout, which is directed to the filling wagon to fill the latter with the chopped crop material. Both the first and the second operator operate based on visual impressions and experience.

In the prior art, for example in US 2003/0174207, it is suggested to use a camera to assist the operators in finding an optimal position of the filling wagon with respect to the forage harvester. Furthermore, the filling spout of the harvester is automatically controlled based on the images from the camera.

A drawback of the known sensor arrangement is that the position of the filling wagon with respect to the forage harvester cannot be determined with a high accuracy in a cost effective manner. With a standard camera, which can be provided at an acceptable cost, the position cannot be determined accurately.

SUMMARY OF THE INVENTION

It is an object of the present invention to accurately determine the position of the filling wagon with respect to the agricultural harvester at an acceptable cost.

To this end, the invention provides a sensor arrangement for monitoring an unloading process of harvested material from an agricultural harvester into a filling wagon, the sensor arrangement comprising:

a frame;

a first camera mounted to the frame at a first position such that, when the filling wagon is located in a filling position with respect to the agricultural harvester, a first image of at least a portion of the filling wagon is capturable by the first camera;

a second camera mounted to the frame at a second position such that, when the filling wagon is located in the filling position, a second image of a segment of the portion is capturable by the second camera, wherein the first camera is provided with one of a CCD and a CMOS sensor such that the angular location of the filling wagon relative to the agricultural harvester is derivable from conventional image processing techniques of the first image, and wherein the second camera is provided with a time-of-flight sensor such that the distance between the agricultural harvester and the filling wagon is derivable from the second image.

The invention is based on the insight that different types of cameras have different strengths and weaknesses. A CCD or CMOS camera typically has a high resolution and can operate correctly in a dusty environment. A time-of-flight camera typically has a significantly lower resolution than a standard CCD or CMOS camera, and is very sensitive to dust (dust influences the distance measurement). By combining these two types of cameras, and using the combination of images to determine the position of the filling wagon with respect to the forage harvester, the first and second cameras synergistically cooperate to accurately determine the position of the filling wagon with respect to the forage harvester using two standard cameras (each having an acceptable cost). Thereby, the first camera (CCD or CMOS camera), is used to determine the position (being the angular location and at least an indication of the distance) of the filling wagon with respect to the forage harvester. This first camera typically has a high resolution and a broader viewing angle (compared to the resolution and viewing angle of the second camera). Thereby, an environmental overview is obtained via the first camera, wherein the filling wagon can be detected. The second camera can measure the distance between the camera and the object, for each pixel. Here, the second camera has a limited resolution, and thereby lacks the overview that the first camera has. However for a predetermined segment of the first image, the second image can add distance information. Thereby, the distance of the filling wagon with respect to the forage harvester can be determined via the second camera, while the first camera determines the angular location with respect to the forage harvester. This allows to track the position of the filling wagon with respect to the forage harvester with a high accuracy using standard cameras.

Preferably the first camera is provided to capture images with a first resolution, and the second camera is provided to capture images with a second resolution, wherein the first resolution is larger than the second resolution. An average time-of-flight camera (time-of-flight camera available on the market) has a significantly lower resolution than an average CCD or CMOS camera. Therefore when, in the invention, a first camera is provided with a higher resolution than a second camera, an average (standard) CCD or CMOS camera can be chosen as the first camera while an average (standard) time-of-flight camera can be chosen as second camera. This allows the invention to be executed using standard camera's that are available on the market for an acceptable price. Therefore the invention is cost effective, because standard camera's can be used.

Preferably the first camera has a first viewing angle and the second camera has a second viewing angle, wherein the first viewing angle is larger than the second viewing angle. A standard CCD or CMOS camera typically has a viewing angle (horizontal viewing angle and vertical viewing angle) that is larger than a standard time-of-flight camera. The combination of a first camera with a "wide" view and a second camera with a "narrow" view allows to track the angular location of a filling wagon with respect to the forage harvester using the first camera (having the wide view), while for a predetermined segment of the wide view (determined by the narrow view), a distance is measured via the second camera. It will be clear that this distance is only relevant for this predetermined segment of the wide view, being the segment where the filling wagon is filled. Remaining parts of the wide view are used to determine the angular location of the filling wagon with respect to the forage harvester, for example by detecting the edges of the filling wagon. Here, it will be clear that the filling spout will be typically directed towards a central region of the filling wagon. Due to the narrow view of the second camera, the edges of the filling wagon are not detectable in this narrow view when the second camera is directed to the central region of the filling wagon. Therefore the wide view of the first camera, combined with the narrow view of the second camera allows to correctly determine the position of the filling spout with respect to the filling wagon by respectively determining the angular location and the distance.

Preferably the sensor arrangement further comprises an image processor operationally connected to the first camera and the second camera to process images from the first and second cameras. By processing the images from the first and second cameras, the position of the filling wagon with respect to the forage harvester can be detected.

Preferably the image processor is configured to detect at least a first intensity peak in the first image and to detect at least a second intensity peak in the second image, wherein the image processor is further configured, based on the detected peaks, to layer the first and second images such that information in the first image is combinable with information in the second image. Intensity (or amplitude) peaks can be easily detected via both a CCD or CMOS camera and a time-of-flight camera. Intensity peaks can be provoked by providing reflectors at an outer surface of the filling wagon. Reflectors will generate a local intensity peak in both the first and second images. The images can be layered by positioning the first and second images with respect to each other such that the detected peaks overlap. When the first image is layered with the second image, information from the first image and the second image can be combined. Particularly, for a certain area of the first image (corresponding to the segment), a distance towards the filling wagon is also known via the second image information.

Preferably the image processor comprises a first image processing path, configured to obtain an angular location and a distance of the filling wagon with respect to the forage harvester based on information from images of the first and second cameras, and a second image processing path, configured as a fallback path to obtain an estimated location and distance of the filling wagon with respect to the forage harvester based on images of only the first camera. The second camera, as explained above, is typically sensitive to dust. Therefore this camera is likely to malfunction for at least a short period of time. The sensor arrangement of the invention can still operate correctly when the second camera is providing unreliable distance information, by determining the positioning of the filling wagon based on the first camera only. This is implemented by providing two image processing paths. In a first, preferred processing path, the combination of the first and second images is used to determine the position of the filling wagon. With this combination, the filling wagon position can be determined accurately. However for the periods of time where the images of the second camera are not reliable due to dust, a second image processing path is provided as a fallback path to obtain the position of the filling wagon based on images of the first camera only.

Preferably the image processor is operationally connected to a filling spout steering mechanism such that the filling spout is steerable based on the determined filling wagon position and distance. Via the filling spout steering mechanism, operationally connected to the image processor, the filling spout can be automatically positioned to fill the filling wagon. This simplifies the operation of the forage harvester, since the operator no longer needs to visually check the position of the filling wagon and adapt the filling spout position manually.

The invention further relates to a method for monitoring an unloading process of harvested material from an agricultural harvester into a filling wagon, the method comprising the steps of:

capturing a first image via a first camera mounted on a frame on the forage harvester, which first camera is provided with one of a CCD and a CMOS sensor, the first image showing, when the filling wagon is located in a filling position with respect to the forage harvester, at least a portion of the filling wagon;

capturing a second image via a second camera mounted on said frame, which second camera is provided with a time-of-flight sensor, the second image showing, when the filling wagon is located in the filling position with respect to the forage harvester, a segment of said portion;

detecting said filling wagon position based on said first image and said second image.

Via the method of the invention, the position of the filling wagon with respect to the forage harvester can be detected in a cost effective manner. The images of the first camera and of the second camera are combined to detect the filling wagon position. As a result of the combination, a standard CCD or CMOS camera can be used as first camera, and a standard time-of-flight camera can be used as second camera. Thereby a cost effective sensor arrangement can detect the correct position of the filling wagon with respect to the forage harvester. The position of the filling wagon may be established by deriving its angular location from the first image and its distance from the second image.

Preferably the method further comprises the steps of detecting at least the first amplitude peak in the first image, detecting at least a second amplitude peak in the second image and layering the first and second images based on the detected peaks. Amplitude peaks are relatively easy to detect in an image. Such peaks can be used to layer a first and second images using standard tools known to the skilled person. When the first and second images are layered, information from the two images can be combined to detect the filling wagon position based on the combination of the first image and the second image.

Preferably the first image is processed to detect an angular location of the filling wagon with respect to the forage harvester, wherein the second image is processed to detect a distance between the filling wagon and the harvester. The first image is typically an image with a higher resolution and a larger viewing angle than the second image. Therefore in the first image, the edges of the filling wagon can be detected, such that the angular location with respect to the harvester can be determined. The second image is typically a narrow image directed towards the segment of the filling wagon where the filling spout is filling the wagon. For this section, it is advantageous to know the distance between the harvester and the filling wagon. This distance can be retrieved from the second image.

Preferably a fingerprint is calculated from a part of the first image, which fingerprint is tracked over successive images of the first camera. Via the fingerprint tracking, a deviation of the angular location of the filling wagon with respect to the forage harvester can be detected. Particularly, it is advantageous for the filling spout to be directed to a predetermined segment of the filling wagon (for example the central segment of the filling wagon). When the speed of the forage harvester is not identical of the speed of the filling wagon, the filling spout might move from being directed to a central zone of the filling wagon to a front of back zone of the filling wagon. This would result in an unequal and/or uncontrolled filling of the filling wagon. By tracking a fingerprint over successive images, such situation can be detected, and corrected at an early stage.

Preferably the step of detecting the filling wagon position based on the first image and second image comprises a first implementation wherein the filling wagon position with respect to the harvester is determined based on both the first and the second image, and wherein a second implementation is provided as a fallback implementation, wherein the filling wagon position with respect to the harvester is determined based on the first image only. By providing a fallback implementation, the position of the filling wagon can still be detected when dust corrupts the second image captured by the second camera.

Preferably the method further comprises the step of calculating the filling degree of the filling wagon. By automatically calculating the filling degree of the filling wagon, the operator is further aided in operating the forage harvester.

Preferably a filling spout of the forage harvester is steered based on the detected filling wagon position. By automatically steering the filling spout to the forage harvester based on the detected position of the filling wagon, operating the forage harvester is further facilitated and human errors are prevented.

BRIEF DESCRIPTION OF THE DRAWINGS

The invention will now be described in more details with respect to the drawings illustrating some preferred embodiments of the invention. In the drawings.

In the drawings a same reference number has been allocated to a same or analogous element.

DETAILED DESCRIPTION OF THE INVENTION

Figure 1:
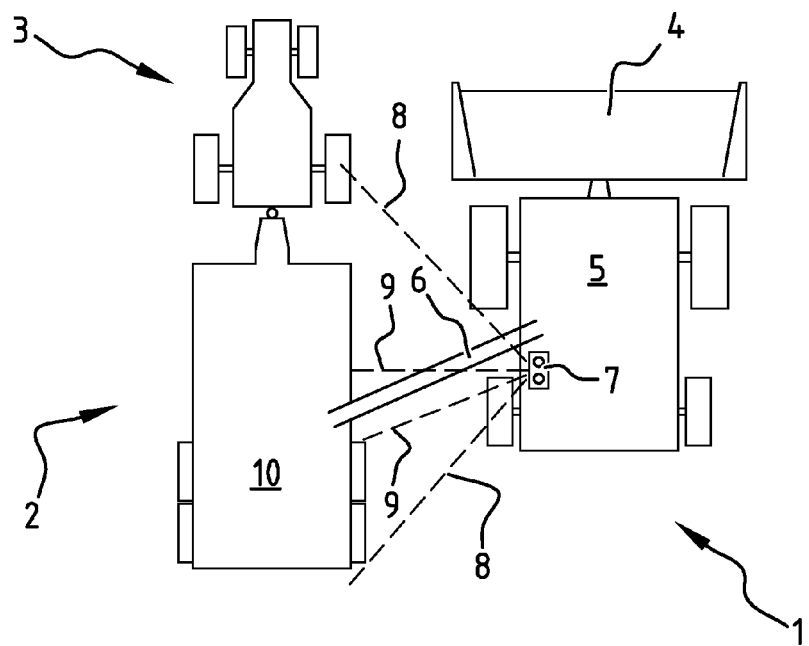
FIG. 1 shows a schematic top view of a forage harvester and a filling wagon that is positioned in a filling position with respect to the harvester.

FIG. 1 shows a top view of a forage harvester 1 and a filling wagon 2. Herein, FIG. 1 shows an embodiment where the filling wagon 2 is positioned laterally adjacent to the harvester 1. It will be clear that this is a mere example, and that the invention is also applicable in situations where the filling wagon 2 is located at the back end of (behind) the forage harvester 1. In the shown example, the filling wagon 2 is towed by a tractor 3.

In practice, a single forage harvester 1 is typically served by multiple combinations of filling wagons 2 and tractors 3. Herein, one filling wagon 2 is positioned with respect to the forage harvester 1 such that the filling wagon 2 can be filled, and other filling wagons are used to relieve the one filling wagon 2 thereby optimizing the forage harvester 1 operation. Particularly, the multiple filling wagons 2 succeed one another in the steps of being filled (as is shown in FIG. 1), carrying away the processed crop material, after being filled, and bringing into place an empty (or emptied) filling wagon which can succeed the filling wagon 2 that is filled, once the filling wagon that is filled is full. Since multiple filling wagons 2 are used, and succeed one another as the wagon to be filled, positioning and repositioning of the filling wagon 2 with respect to forage harvester 1, is frequently done. The sensor arrangement of the invention significantly facilitates correctly positioning the filling wagon 2 with respect to the forage harvester 1.

The forage harvester 1 typically is provided with a header 4. The header is operable to harvest crop material, or to pick up previously mown crop material. The harvester 1 further comprises a main body 5. The main body 5 together with the header 4, is provided to process crop material. An example of such processing of crop material is chopping the crop material into pieces. The processed crop material is then blown out of the main body 5 via a filling spout 6 into the filling wagon 2. The filling spout 6 is typically provided such that its height and/or angular position with respect to the forage harvester 1 can be adjusted. As an alternative to adjusting the height of the filling spout 6, the spout can be provided with a deflector at an end of the spout 6, which deflector influences the up/down direction in which the material is released. Thus, by adjusting the deflector angle, the material blowing distance can be adjusted. By adjusting the angular position and/or height (or deflector angle) of the filling spout 6, variations in relative position of the filling wagon 2 with respect to the harvester 1 can be compensated via the filling spout.

The forage harvester 1 further comprises a sensor arrangement 7. The sensor arrangement 7 is preferably mounted in a proximity of the location where the filling spout 6 is connected to the main body 5. Here, "in a proximity" is defined as within a range of 1.5 m, preferably within a range of 1 m, more preferably within a range of 50 cm. Alternatively, the sensor arrangement 7 is mounted on the spout itself. Preferably, the sensor arrangement 7 is mounted on the spout at a distance of about 2.5 meter from the spout-main body connection.

The sensor arrangement 7 comprises a first camera and a second camera. It will be clear to the skilled person that these cameras can be housed in one housing. The first and second cameras are directed in substantially the same direction. Particularly, the first and second cameras are directed towards an ideal filling position of the filling wagon 2 with respect to the forage harvester 1. More particularly, each of the first and second cameras is positioned such that a center region of the images captured by the cameras shows the filing position of the filling wagon 2 (being the position where the filling spout ejects the processed crop material into the filling wagon).

The first camera has a first viewing angle that is preferably larger than 60 degrees, more preferably larger than 80 degrees, most preferably larger than 100 degrees. The first camera is provided with a CCD or CMOS sensor. The skilled person will recognize that sensors equivalent to a CCD or CMOS sensor, can also be used according to the invention. The sensor of the first camera comprises preferably more than 1 megapixel, more preferably more than 2 megapixel, most preferably more than 3 megapixel. Due to the large viewing angle and the high number of pixels, the images from the first camera show an overview of the area where the filling wagon 2 is to be positioned. This will be explained in more detail with respect to FIG. 2.

The second camera has a viewing angle that is significantly smaller than the viewing angle of the first camera. Preferably, the viewing angle of the second camera is smaller than 90 degrees, preferably smaller than 80 degrees, more preferably about 70 degrees. The second camera is provided with a time-of-flight sensor. As resolutions of such time-of-flight sensor are likely to increase in the future, wider opening angles might become more beneficial in the future. Herein, the second camera measures for each pixel or group of pixels the distance between the sensor and the object perceived in the pixel or group of pixels. When the pixel shows a part of a surface of the filling wagon 2, the time-of-flight sensor will measure the distance between this surface part and the sensor. The second camera preferably comprises less than 1 megapixel, more preferably less than 0.5 megapixel, most preferably less than 0.3 megapixel. Due to the small viewing angle and rather limited number of pixels, the second camera provides a zoomed image of a specific region of interest. For this specific region of interest, the second camera provides distance information wherein the distance between the forage harvester (or second camera) and a target (for example being the filling wagon 2 when this filling wagon is substantially in a filling position with respect to the forage harvester 1) is measured. This distance information can be used to establish the position of the open end 10 of the filling wagon 2.

Figure 2:
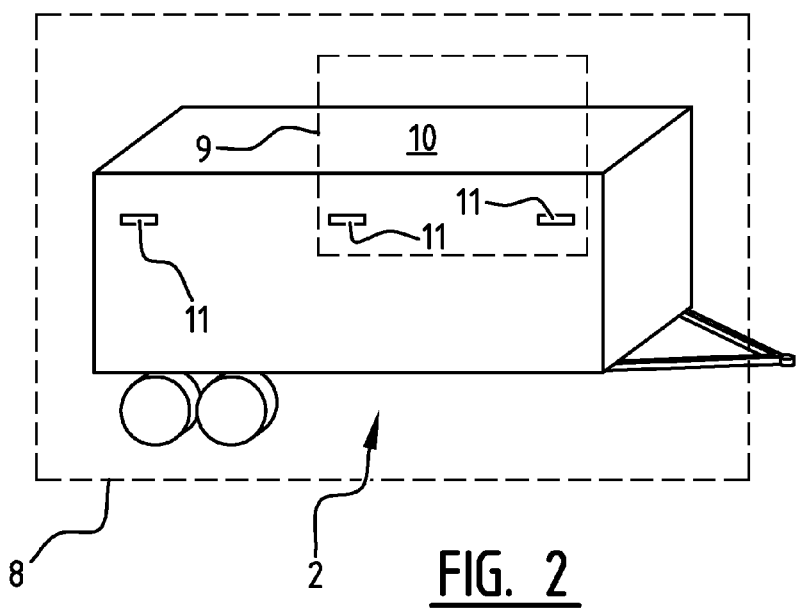
FIG. 2 shows a first image and a second image, which are layered.

FIG. 2 shows a filling wagon 2 from the point of view of the sensor arrangement 7. Here, FIG. 2 shows the view of the first camera, delineated by dotted line 8. In the further description this first view delineated by dotted line 8, will be referred to as the first image 8. It will be clear that the "first" in first image does not relate to a succession of images, but refers to the image being captured by the first camera. FIG. 2 further shows how a segment of the first image 8 is also captured by the second camera, which segment is delineated by dotted line 9. This segment delineated by dotted line 9 will be referred to as the second image 9. Thereby, the term second in second image does not relate to a succession of images, but refers to the fact that this second image 9 is captured by the second camera. Thereby, the skilled person will recognize that when the first and second cameras capture a succession of images, each of these instances will comprise a first and a second image, respectively captured by the first camera and the second camera. Herein, the first and second cameras can capture images using a same or a different frame rate.

The first image 8 and the second image 9 are layered such that information from the first image is combinable with information from the second image. Layering of the first image 8 and the second image 9 can be based on different techniques. In a first example, the position and orientation of the first camera is fixed with respect to the position and orientation of the second camera, such that the second image 9 forms a predetermined part of the first image 8. Alternatively, amplitude peaks (or intensity peaks) are measured in both the first image 8 and the second image 9. Thereby, it will be clear that amplitude/intensity peaks relate to light intensity amplitude peaks. Such peaks can be induced by reflectors 11 that are provided onto outer surfaces of the filling wagon 2. These amplitude peaks allow the first image 8 and the second image 9 to be layered based on internal image information (amplitude peaks). A combination of the above mentioned techniques, wherein the second image is known to lie somewhere in a zone of the first image, whereby the specific position of the second image is determined by amplitude peaks measured in the first and second images, is also possible. Alternatively, in particular in a backward-filling situation (where the filling wagon is located behind the harvester), the wider view of the first image 8 allows to detect reflectors on the tractor (pulling tractor of the filling wagon) and reflectors on the filling wagon. Thereby, via the 2D camera, a distinction can be made between the reflectors on the tractor and the reflectors on the filling wagon.

After having layered the first image 8 and the second image 9, the combined information of the first image 8 and the second image 9 can be used to establish the exact position of the filling wagon 2 with respect to the forage harvester 1. Therein, edges of the filling wagon 2 are detected in the first image 8. Edges comprise the left and right edge as well as the lower and top edge of the filling wagon 2. Via this edge detection, the angular location of the filling wagon 2 with respect to the forage harvester can be detected. Thereby, angular location is defined as the direction with respect to the forage harvester 1. Furthermore, an indication of the distance to the filling wagon can be obtained from the second image. The combination of angular location and indication of the distance provides a position indication of the filling wagon with respect to the harvester.

In this regard, there are two ways of specifying an absolute position with respect to a point of origin. On the one hand, the position can be defined as a distance in one direction and a distance in another direction (X, Y—Cartesian coordinates) both measured with respect to the point of origin. On the other hand, a position can be defined as an angle and a distance ($\alpha$, a-polar coordinates) measured with respect to the point of origin. The point of origin in the current example is the forage harvester 1 and more particularly, the sensor arrangement 7. Herein, the angular location that can be defined by analysing the first image 8, corresponds to the angle $\alpha$. For a certain zone of interest (segment 9), the second image adds distance information, corresponding to the distance a (thereby defining the position of the filling wagon via the ($\alpha$, a) combination). Hence, the combined information of the first and second images provides all input to exactly determine the position of the filling wagon 2 with respect to the forage harvester 1 by providing the $\alpha$, a values.

Once the filling wagon 2 is positioned with respect to the forage harvester 1 in a filling position, a fingerprint is calculated using the first image, or a section of the first image, which fingerprint is directed to at least a part of the filling wagon 2. In successive images (images captured via the first camera over time), this fingerprint is tracked such that a deviation of the position of the filling wagon 2 relative to the forage harvester 1 is detectable via the fingerprint tracking. This allows keeping the filling wagon 2 and filling spout 6 substantially locked with respect to one another during filling of the filling wagon 2. In this manner, the filling wagon 2 can be evenly filled.

The sensor arrangement 7 of the invention is preferably provided with an image processor. The image processor is adapted to execute the processes that are described above for determining the position of the filling wagon 2, and for layering and interpreting the first image 8 and second image 9. Here, the processor is preferably operationally connected to the filling spout 6, such that the filling spout 6 is steerable based on the determined position of the filling wagon 2 with respect to the forage harvester 1.

The second camera, which is a time-of-flight camera, is typically sensitive to dust. This means that when a certain level of dust is present in the air around the filling wagon 2, the second image 9 provides unreliable information. Such a situation can be detected by the processor, for example in a situation where the measured distances are incoherent (or deviate from previous or predetermined values). When such a situation is detected, the processor preferably switches from a first state (wherein the combination of the first image 8 and the second image 9 is used to determine the position of the filling wagon 2 with respect to the forage harvester 1) to a second state wherein only the first image 8 is used to determine the position of the filling wagon 2 with respect to the forage harvester 1. Tests have shown that such a situation where the information from the second camera 9 is unreliable, only occurs for a limited period of time. Therefore, for such limited period of time, determining the position based on the first image 8 only does not significantly influence the reliability of the determined position since, in the moments before this specific period, the second image 9 did provide reliable information. Via this second state, which is a fallback state for the preferred first state, it is avoided that dust corrupts the complete position determination system. Via the second state, the position can still be determined (yet less accurate) such that during the rather short period of time where the second camera is obstructed, the position of the filling wagon 2 can still be determined.

The above described embodiments and the shown figures are illustrative and serve only for a better understanding of the invention. The invention is not limited to the described embodiments. Different alternatives, and preferred features described in the text can be freely combined by a skilled person and developed in more detail to form an operational whole without departing from the essence of the invention. The scope of protection of the invention will therefore be defined solely by the claims.

The invention claimed is:

1. A sensor arrangement for monitoring an unloading process of harvested material from an agricultural harvester into a filling wagon, the sensor arrangement comprising:
    a frame;
    a first camera mounted to the frame at a first position such that, when the filling wagon is located in a filling position with respect to the agricultural harvester, a first image of at least a portion of the filling wagon is capturable by the first camera; and
    a second camera mounted to the frame at a second position such that, when the filling wagon is located in the filling position, a second image of a segment of the portion is capturable by the second camera,
    wherein the first camera is provided with one of a CCD and a CMOS sensor such that an angular location of the filling wagon relative to the agricultural harvester is derivable from the first image, and wherein the second camera is provided with a time-of-flight sensor such that a distance between the agricultural harvester and the filling wagon is derivable from the second image.

2. The sensor arrangement of claim 1, wherein the first camera is provided to capture images with a first resolution, and wherein the second camera is provided to capture images with a second resolution, wherein the first resolution is larger than the second resolution.

3. The sensor arrangement of claim 1, wherein the first camera has a first viewing angle and the second camera has a second viewing angle, wherein the first viewing angle is larger than the second viewing angle.

4. The sensor arrangement of claim 1, further comprising an image processor operationally connected to the first camera and the second camera to process images from the first and second camera.

5. The sensor arrangement of claim 4, wherein the image processor is configured to detect in the first image at least a first intensity peak and to detect in the second image at least a second intensity peak, wherein the image processor is further configured, based on the detected intensity peaks, to layer the first and second images such that information in the first image is combinable with information in the second image.

6. The sensor arrangement of claim 5, wherein the image processor comprises a first image processing path, configured to obtain an angular location and a distance of the filling wagon with respect to the agricultural harvester based on information in images of the first and the second cameras, and a second image processing path, configured as a fallback path to obtain a location and distance of the filling wagon with respect to the agricultural harvester based on images of only the first camera.

7. The sensor arrangement of claim 4, wherein the image processor is operationally connected to a steering mechanism of a filling spout such that the filling spout is steerable based on the derived angular location of the filling wagon and the derived distance between the agricultural harvester and the filling wagon.

8. A method for monitoring an unloading process of harvested material from an agricultural harvester into a filling wagon, the method comprising the steps of:
    capturing a first image via a first camera mounted on a frame on the agricultural harvester, which first camera is provided with one of a CCD and a CMOS sensor, the first image showing, when the filling wagon is located in a filling position with respect to the agricultural harvester, at least a portion of the filling wagon;
    capturing a second image via a second camera mounted on the frame, which second camera is provided with a time-of-flight sensor, the second image showing, when the filling wagon is located in the filling position, a segment of the portion; and
    detecting the filling wagon position based on the first image and the second image.

9. The method according to claim 8, wherein the step of detecting comprises sub-steps of:
    detecting in the first image at least a first intensity peak,
    detecting in the second image at least a second intensity peak, and
    layering the first and second images based on the detected intensity peaks.

10. The method according to claim 8, wherein the step of detecting comprises processing the first image to detect an angular location of the filling wagon with respect to the agricultural harvester, and processing the second image to detect a distance between the filling wagon and the harvester.

11. The method according to claim 8, wherein the step of detecting comprises calculating a fingerprint from a part of the first image, and tracking the fingerprint over successive images of the first camera.

12. The method according to claim 8, wherein the step of detecting the filling wagon position based on the first image and the second image comprises:
   a first implementation of determining the filling wagon position with respect to the harvester based on both the first image and the second image, and
   a second implementation, as a fallback implementation, of determining the filling wagon position with respect to the harvester based on only the first image.

13. The method according to claim 8, further comprising the step of calculating the filling degree of the filling wagon.

14. The method according to claim 8, further comprising the step of steering a filling spout of the agricultural harvester based on the detected filling wagon position.

* * * * *